W. A. BAUDE.
PROCESS OF MANUFACTURING CUTTING DISKS.
APPLICATION FILED SEPT. 14, 1915.
1,198,314.
Patented Sept. 12, 1916.
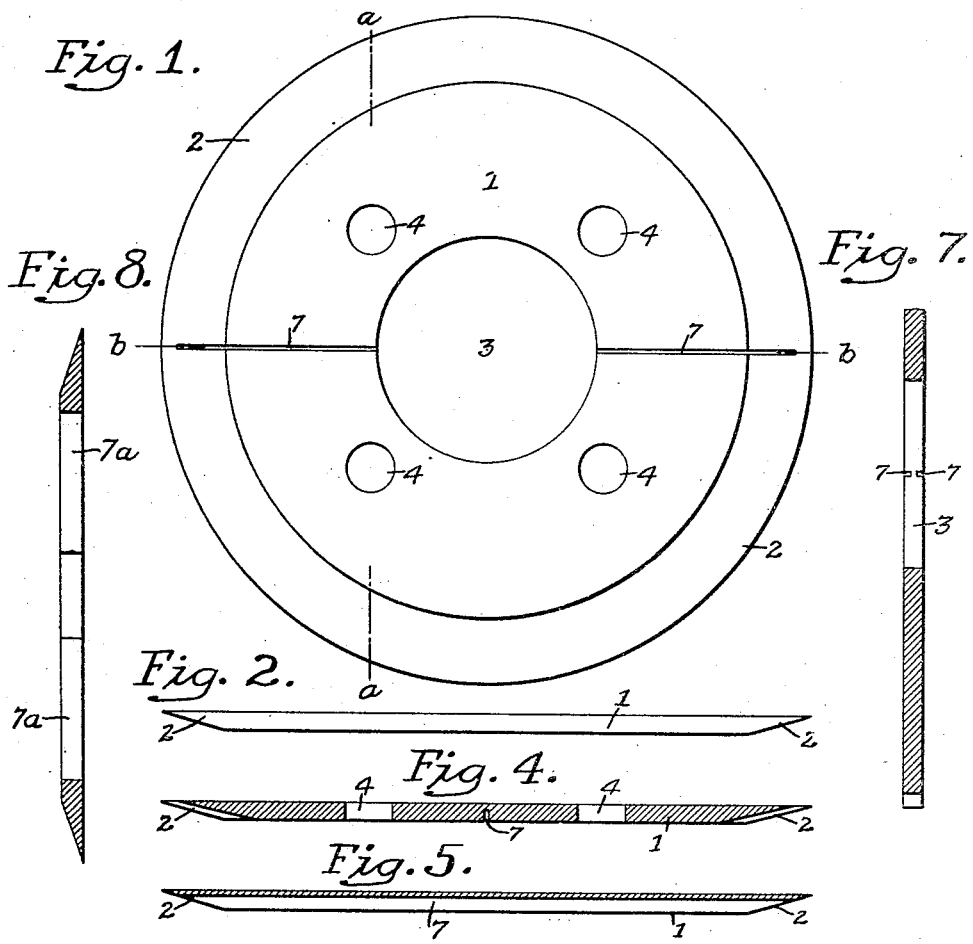
Inventor—
William A. Baude
by his Attorneys
Howson & Howson

UNITED STATES PATENT OFFICE.

WILLIAM A. BAUDE, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

PROCESS OF MANUFACTURING CUTTING-DISKS.

1,198,314. Specification of Letters Patent. Patented Sept. 12, 1916.

Application filed September 14, 1915. Serial No. 50,646.

*To all whom it may concern:*

Be it known that I, WILLIAM A. BAUDE, a citizen of the United States, residing in Philadelphia, Pennsylvania, have invented certain Improvements in Processes of Manufacturing Cutting-Disks, of which the following is a specification.

My invention relates to certain improvements in cutting disks, particularly those for cutting paper and other felted materials.

The object of my invention is to make the disk preferably in two parts and, during the process of manufacture, to make the disk in a single piece but in such a manner that it can be separated so that, when the parts are assembled, one part will accurately fit the other part.

While the invention is particularly adapted for use in the manufacture of cutting disks, it will be understood that the invention can be carried out in making two-part wheels or pulleys.

A disk or wheel, made in accordance with my invention, can be applied to a shaft or removed therefrom without removing the shaft from its bearings.

In the accompanying drawings:—Figure 1, is a side view of a cutting disk made in accordance with my invention; Fig. 2, is a plan view; Fig. 3, is a view showing the two parts of the cutter separated; Fig. 4, is a sectional view on the line a—a, Fig. 1; Fig. 5, is a sectional view on the line b—b, Fig. 1; Fig. 6, is a perspective view of a part of one section illustrating more clearly the article made in accordance with my invention; and Figs. 7 and 8, are views of modifications of the method of carrying out the invention.

Referring to the drawings, 1 is the cutting disk having a beveled edge 2 and a hole 3, for the shaft or mandrel.

4, 4 are the holes for the studs, or bolts, which secure the disk to the head, or other structure, which is mounted on the shaft, the shaft extending through the hole 3. The disk, in the present instance, is made in two sections 5 and 6, so that it can be applied to or removed from the shaft without disturbing the bearings for the shaft. This is accomplished by removing the bolts or pins 4, which hold the disk to the head, after which the parts can be removed and another set applied, or these parts can be reapplied, if necessary.

The process of manufacturing my improved disk is as follows: The cutting disk is made in a single piece and the disk is beveled to form the cutting edge in the ordinary manner and a groove 7 is cut in the face of the disk, preferably in the side of the disk opposite to the cutting edge. This groove can be cut to such a depth that the parts will be held together during the final finishing of the disk and while it is being hardened. Then, after the disk is hardened, it is severed or broken on the line of the groove so that each section has a rough meeting edge, as indicated in Fig. 6. The two rough edges intermesh when the two parts are placed together on the shaft so that at the cutting side of the disk there is an almost imperceptible joint and the cutting edge is practically continuous. This makes an exceedingly satisfactory disk and one which can be accurately made in two parts in order that it may be readily detached from the shaft when desired.

My improved process of making cutter disks enables the manufacturer to harden the disks to a high degree so that a file will have no effect on them.

Prior to my invention these disks were made in sections by shearing and were filed and fitted; the metal being left soft enough to be sheared. This shearing and filing process changes the complete circle of the disks on the outside and the hole on the inside and requires extra fitting and grinding to bring the outside diameter of the disk to a true circle and the inside hole to the exact diameter. My process eliminates this extra work and the cutting disk retains its true circle and size.

The disk can be made in any size and of any thickness and, in some instances, where the cutting edge is at the center, two grooves may be cut, one on one side of the disk and the other on the opposite side, as indicated in Fig. 7. The disk can also be made as shown in Fig. 8, in which it is shown slotted at 7ª, the slot extending through the disk but stopping short of the cutting edge, so that, when the disk is broken, the cutting edge is continuous and the size of the disk is not altered.

I claim:—

1. The process herein described of making disks or like objects, said process consisting in making the disk in a single piece and with a beveled circumferential cutting edge, then forming a groove across the face of the disk opposite said beveled edge so as to weaken the disk at this point, then hardening the disk and finally breaking the disk into two parts on the line of said groove so that the abutting edges of the two parts will be rough and one section will intermesh with the other.

2. The process herein described of making a two-part element, said process consisting in cutting a groove across the element radial to the axis thereof so as to weaken it at the groove, then hardening the element and severing it on a line with the groove so that the parts of the sections of said element which come into contact will have a roughened surface, one surface fitting the other.

3. The process herein described of making a disk having a cutting edge, said process consisting in cutting a groove across the face of the disk so as to weaken the disk at this point, said groove terminating short of the cutting edge, then hardening the disk and breaking it on the line of the groove, the fracture being through the cutting edge.

4. The process herein described of making a cutting disk having an annular cutting edge at one side, said process consisting in beveling the disk to form the cutting edge, perforating the disk for the passage of the shaft, then cutting a groove across the face of the disk on the side opposite the cutting edge so as to weaken the disk at the groove and then hardening the disk and finally breaking the disk on the line of the groove, the fracture extending through the cutting edge so that, when the two parts are mounted on the shaft and fitted together, the cutting edge will be continuous.

WILLIAM A. BAUDE.

Copies of this patent may be obtained for five cents each, by addressing the "Commissioner of Patents, Washington, D. C."